United States Patent
Souza Vaz et al.

(10) Patent No.: US 12,436,929 B2
(45) Date of Patent: Oct. 7, 2025

(54) AUTOMATED MAINFRAME DATABASE MAINTENANCE

(71) Applicant: Kyndryl, Inc., New York, NY (US)

(72) Inventors: Marcelo De Souza Vaz, Rio de Janeiro (BR); Marcos Eugenio Fernandes, Sao Paulo (BR); Thiago Bianchi, São Carlos (BR); Adriana Melges Quintanilha Weingart, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 884 days.

(21) Appl. No.: 17/680,558

(22) Filed: Feb. 25, 2022

(65) Prior Publication Data

US 2023/0273908 A1    Aug. 31, 2023

(51) Int. Cl.

| | | |
|---|---|---|
| G06F 16/21 | (2019.01) | |
| G06F 11/07 | (2006.01) | |
| G06F 16/22 | (2019.01) | |
| G06F 16/23 | (2019.01) | |
| G06F 16/2458 | (2019.01) | |
| G06N 20/00 | (2019.01) | |

(52) U.S. Cl.
CPC ........ *G06F 16/217* (2019.01); *G06F 11/0727* (2013.01); *G06F 16/2272* (2019.01); *G06F 16/2282* (2019.01); *G06F 16/2308* (2019.01); *G06F 16/2477* (2019.01); *G06N 20/00* (2019.01)

(58) Field of Classification Search
CPC ............................ G06F 17/217; G06F 16/2272
USPC .................... 706/25; 707/600, 636, 659, 609
See application file for complete search history.

(56) References Cited

U.S. PATENT DOCUMENTS

| | | |
|---|---|---|
| 5,832,496 A | 11/1998 | Anand et al. |
| 6,366,901 B1 | 4/2002 | Ellis |
| 6,944,630 B2 | 9/2005 | Vos et al. |
| 6,996,576 B2 | 2/2006 | Vos et al. |
| 7,143,120 B2 | 11/2006 | Oks et al. |

(Continued)

OTHER PUBLICATIONS

Mell et al., "The NIST Definition of Cloud Computing", NIST, Special Publication 800-145, Sep. 2011, 7 pages.

*Primary Examiner* — Hung T Vy
(74) *Attorney, Agent, or Firm* — Erik Swanson; Andrew M. Calderon; Calderon Safran & Wright P.C.

(57) ABSTRACT

Systems and methods for automated mainframe database maintenance are provided. In implementations, a method includes obtaining, by a computing device, real-time performance metrics of a mainframe database; automatically generating, by the computing device, a predicted maintenance task as an output of a trained database maintenance task classification machine learning (ML) model based on an input of the real-time performance metrics; automatically generating, by the computing device, a time to execute the predicted maintenance task as an output of a trained database maintenance triggering ML model based on an input of the predicted maintenance task and the real-time performance metrics; automatically generating, by the computing device, maintenance task instructions for the mainframe database based on the predicted maintenance task, the time to execute the predicted maintenance task, and a maintenance profile of the mainframe database; and automatically initiating, by the computing device, the execution of the maintenance task instructions.

18 Claims, 9 Drawing Sheets

(56) References Cited

U.S. PATENT DOCUMENTS

| | | |
|---|---|---|
| 7,181,461 B2 | 2/2007 | Bonner et al. |
| 7,363,324 B2 | 4/2008 | Aboulnaga et al. |
| 7,366,740 B2 | 4/2008 | Sleeman et al. |
| 7,596,573 B2 | 9/2009 | O'Neil et al. |
| 7,912,820 B2 | 3/2011 | Garden et al. |
| 9,037,536 B2 | 5/2015 | Vos et al. |
| 10,452,629 B2 | 10/2019 | Hrle et al. |
| 10,613,899 B1 * | 4/2020 | Saha ........................ G06N 20/20 |
| 2004/0172408 A1 | 9/2004 | Klosterhalfen et al. |
| 2005/0223046 A1 | 10/2005 | Smith |
| 2017/0344639 A1 | 11/2017 | Ahmed et al. |
| 2019/0138631 A1 | 5/2019 | Crane |
| 2019/0311293 A1 * | 10/2019 | Bowers ................... G06F 3/067 |
| 2020/0153896 A1 | 5/2020 | Kumar et al. |
| 2022/0343257 A1 * | 10/2022 | Mohanty ................. G06F 40/30 |

* cited by examiner

| | | | | | | | | Maintenance Data Profile | Maintenance Profile Start Time | Failures | Recovery Data Profile |
|---|---|---|---|---|---|---|---|---|---|---|---|
| v1 | v2 | v3 | v4 | v5 | v6 | v7 | v8 | | | | |
| | | | | | | | | 0 | | 0 | |
| | | | | | | | | 0 | | 0 | |
| | | | | | | | | 0 | | 0 | |
| | | | | | | | | image copy | t1 | 0 | |
| | | | | | | | | 0 | | 0 | |
| | | | | | | | | 0 | | 1 | profile p1 |
| | | | | | | | | 0 | | 0 | |
| | | | | | | | | 0 | | 0 | |
| | | | | | | | | runstats | t2 | 0 | |
| | | | | | | | | 0 | | 1 | profile p2 |
| | | | | | | | | 0 | | 0 | |
| | | | | | | | | 0 | | 0 | |
| | | | | | | | | 0 | | 0 | |
| | | | | | | | | image copy | t3 | 0 | |

FIG. 6

AUTOMATED MAINFRAME DATABASE MAINTENANCE

BACKGROUND

Aspects of the present invention relate generally to database maintenance and, more particularly, to automated mainframe database maintenance utilizing machine learning (ML) models.

In general, a mainframe database is a large database which supports numerous workstations or peripherals and is utilized by organizations for critical applications such as bulk data processing. Database management systems (DBMS) are often utilized to maintain and manage a mainframe database. Maintenance and management of a DBMS can require many manual decisions and tasks to be performed by a skilled administrator. Some automated processes have been developed to assist in the maintenance and management tasks of a DBMS. One example is automated task-scheduling processes developed to automatically address some DBMS management tasks.

SUMMARY

In a first aspect of the invention, there is a computer-implemented method including: obtaining, by a computing device, real-time performance metrics of a mainframe database; automatically generating, by the computing device, a predicted maintenance task as an output of a trained database maintenance task classification machine learning (ML) model based on an input of the real-time performance metrics; automatically generating, by the computing device, a time to execute the predicted maintenance task as an output of a trained database maintenance triggering ML model based on an input of the predicted maintenance task and the real-time performance metrics; automatically generating, by the computing device, maintenance task instructions for the mainframe database based on the predicted maintenance task, the time to execute the predicted maintenance task, and a maintenance profile of the mainframe database; and automatically initiating, by the computing device, the execution of the maintenance task instructions by the mainframe database.

In another aspect of the invention, there is a computer program product including one or more computer readable storage media having program instructions collectively stored on the one or more computer readable storage media. The program instructions are executable to: obtain real-time performance metrics of a mainframe database; automatically generate a predicted maintenance task as an output of a trained database maintenance task classification machine learning (ML) model based on an input of the real-time performance metrics; automatically generate a time to execute the predicted maintenance task as an output of a trained database maintenance triggering ML model based on an input of the predicted maintenance task and the real-time performance metrics; automatically generate maintenance task instructions for the mainframe database based on the predicted maintenance task, the time to execute the predicted maintenance task, and a maintenance profile of the mainframe database; and automatically initiate the execution of the maintenance task instructions by the mainframe database.

In another aspect of the invention, there is system including a processor, a computer readable memory, one or more computer readable storage media, and program instructions collectively stored on the one or more computer readable storage media. The program instructions are executable to: obtain real-time performance metrics of a mainframe database; automatically generate a predicted maintenance task as an output of the trained database maintenance task classification ML model based on an input of the real-time performance metrics; automatically generate a time to execute the predicted maintenance task as an output of a trained database maintenance triggering ML model based on an input of the predicted maintenance task and the real-time performance metrics; automatically generate maintenance task instructions for the mainframe database based on the predicted maintenance task, the time to execute the predicted maintenance task, and a maintenance profile of the mainframe database; and automatically initiate the execution of the maintenance task instructions by the mainframe database.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 depicts an exemplary time series dataset in accordance with aspects of the invention.

DETAILED DESCRIPTION

Figure 1:
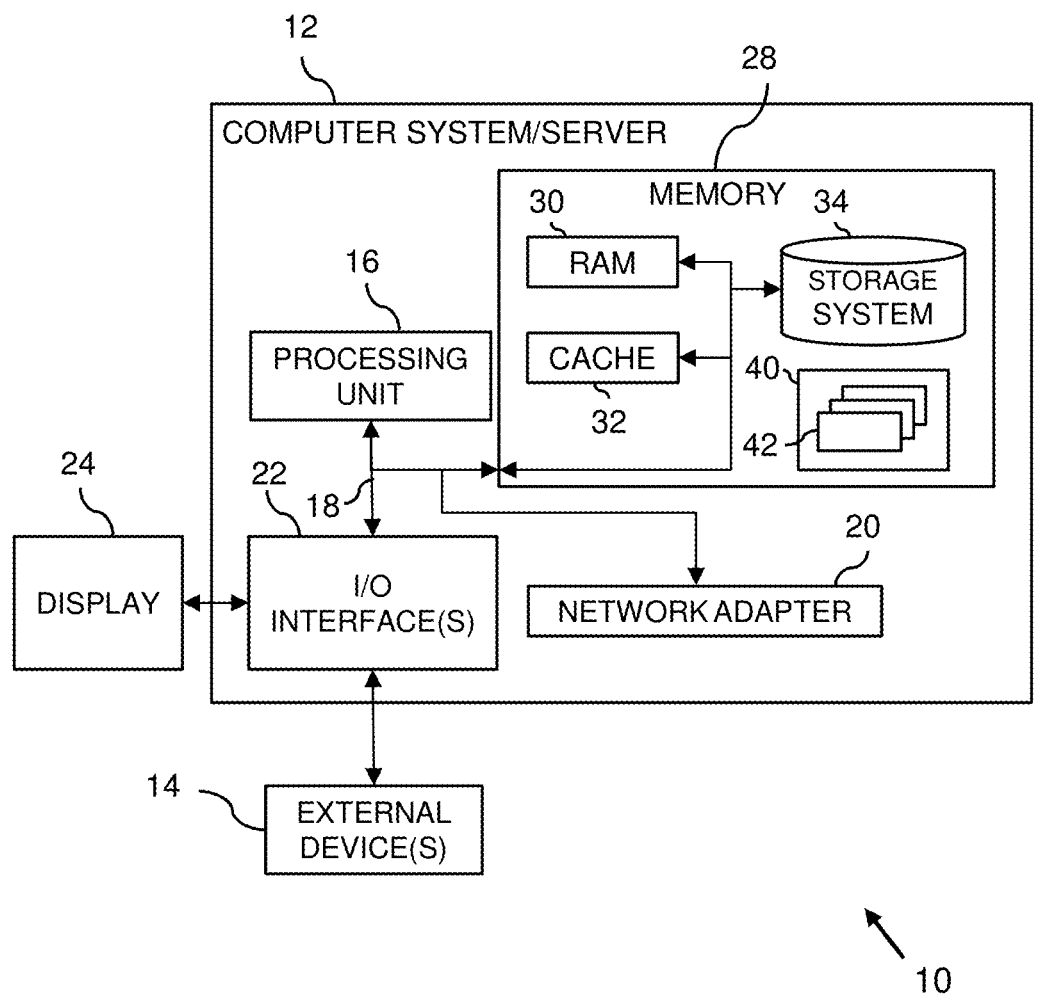
FIG. 1 depicts a cloud computing node according to an embodiment of the present invention.

Aspects of the present invention relate generally to database maintenance and, more particularly, to automated mainframe database maintenance utilizing machine learning (ML) models. In embodiments, systems and methods are provided to automatically perform maintenance tasks in mainframe database platforms without restarting the database. Implementations of the invention employ: an anomaly detection machine learning (ML) model to monitor operation parameters of a mainframe environment in real-time; a predictive ML model to predict trends and detect future maintenance events; a classification ML model to suggest a non-intrusive maintenance task using captured readings; a ML model that converts a procedure into a maintenance task using expert database repositories; and a real-time ML model that executes a maintenance task by detecting a satisfactory condition of the system to perform such a maintenance.

In embodiments, a computer-implemented process is provided for automatically performing maintenance tasks in a database without restarting the database. In implementations, the computer-implemented process includes: in response to receiving historical performance related metrics, computing a time-series using average transaction response times, central processing unit (CPU) usage, and number of transactions considering a predefined time rate or timeframe; enhancing the time-series computed by adding metrics related to database organization aspects including table space availability, index space availability, and table fragmentation rate; enhancing the time-series computed by adding statistics for access plans including table size, table type, number of indexes, types of indexes, and number of columns; enhancing the time-series computed by labelling with a maintenance task at the time the maintenance task was executed including image copy, runstats, reorg index, and reorg tablespace; enhancing the time-series computed by labelling when a failure happened including out of space, and time out; enhancing the time-series computed by adding a time to start the maintenance task; enhancing the time-series computed by recording a historical recovery profile; and storing a time-series dataset containing the time-series enhanced in a dataset repository.

In implementations, the computer-implemented process for performing maintenance tasks in a database without restarting the database further includes: in response to training a database monitor anomaly detection model using the time-series dataset computed using a regression machine learning technique, storing the database monitor anomaly detection model in a machine learning model repository; in response to training a database maintenance task classification model using the time-series dataset enhanced using a classification machine learning technique, storing the database maintenance task classification model in the machine learning model repository; in response to training a database failure prediction model using the dataset enhanced using a long short-term memory (LSTM) neural network machine learning technique, storing the database failure prediction model in the machine learning model repository; in response to training a database maintenance triggering model using the dataset enhanced using a machine learning technique, storing the database maintenance triggering model in the machine learning model repository; and in response to training a database maintenance failure profile model using the dataset enhanced using a classification machine learning technique, storing the database maintenance failure profile model in the machine learning model repository.

In implementations, the computer-implemented process for performing maintenance tasks in a database without restarting the database further includes: in response to receiving performance related metrics from a mainframe database catalog, executing the database monitor anomaly detection model to detect whether readings received in performance related metrics are related to an unpredicted behavior of the mainframe database using a predicted same number of readings received in comparison with the readings; in response to determining a difference exceeding a predetermined threshold, notifying a database administrator of an anomalous or unpredicted behavior detected; executing the database maintenance task classification model to predict a certain maintenance task using the readings; executing the database maintenance triggering model to predict an ideal time to start maintenance using the certain maintenance task predicted using the readings; executing a predetermined maintenance profile using predefined profiles according to the certain maintenance task predicted and a start time predicted to create an output; initiating an operations planning and control task into a scheduler of a mainframe by executing the output; executing the database failure prediction model to determine a probability of an imminent failure occurring using the readings to predict a variable that indicates a failure; and executing the database maintenance failure profile model to suggest a recovery profile to the database administrator.

Larger companies normally demand highly available database systems and cannot afford stopping their operations to perform maintenance tasks. Also, mainframe platforms do not allow the execution of new jobs at any time. Advantageously, embodiments of the invention automatically orchestrate the difficult task of maintaining database systems in mainframe platforms without the need to restart a mainframe. Embodiments create an on-demand flow based on a real-time analysis of an actual environment. In can be understood that the technical field of mainframe maintenance and management is improved by implementations of the invention that enable automated maintenance tasks based on machine learning models that improve in accuracy with training over time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
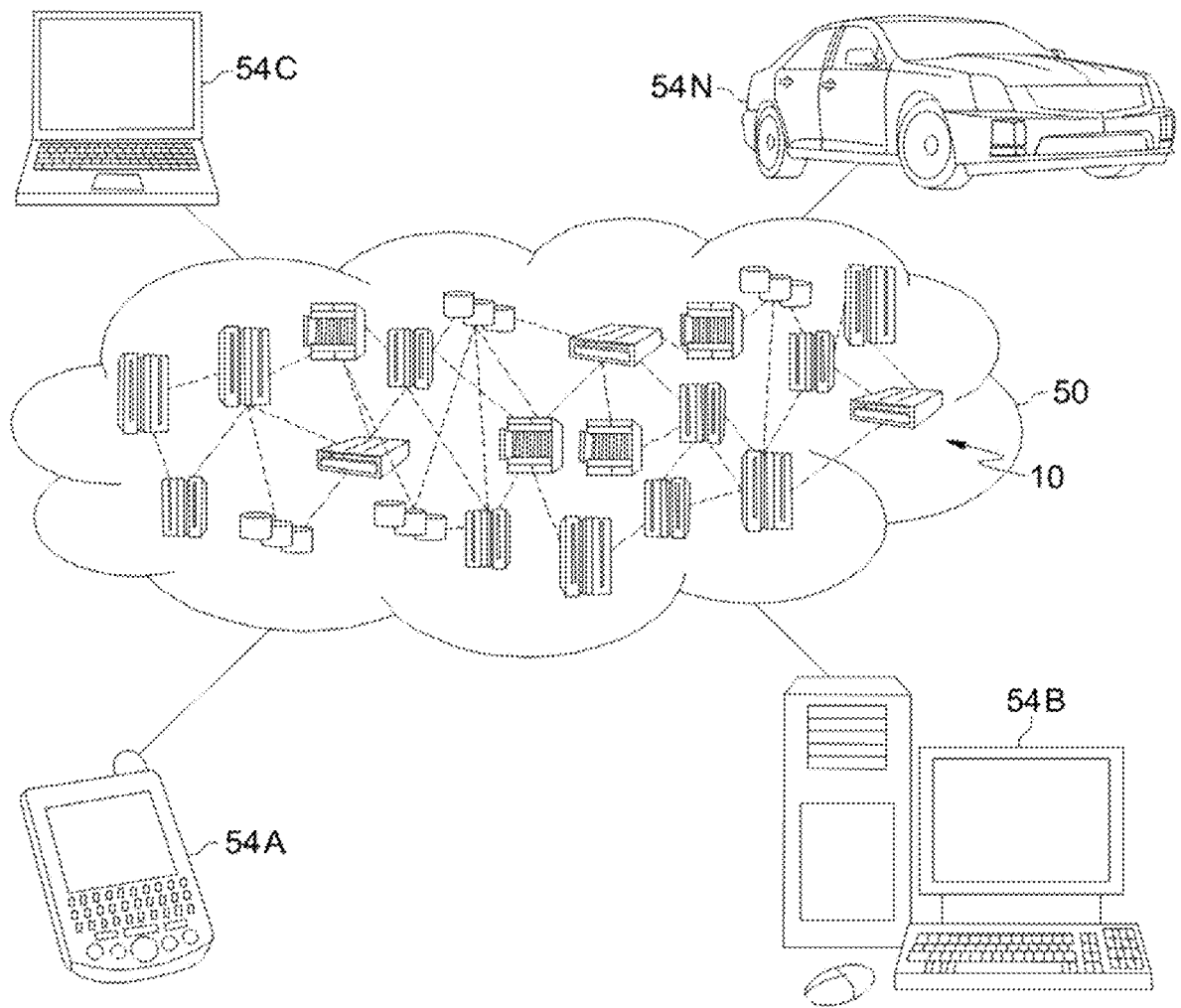
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
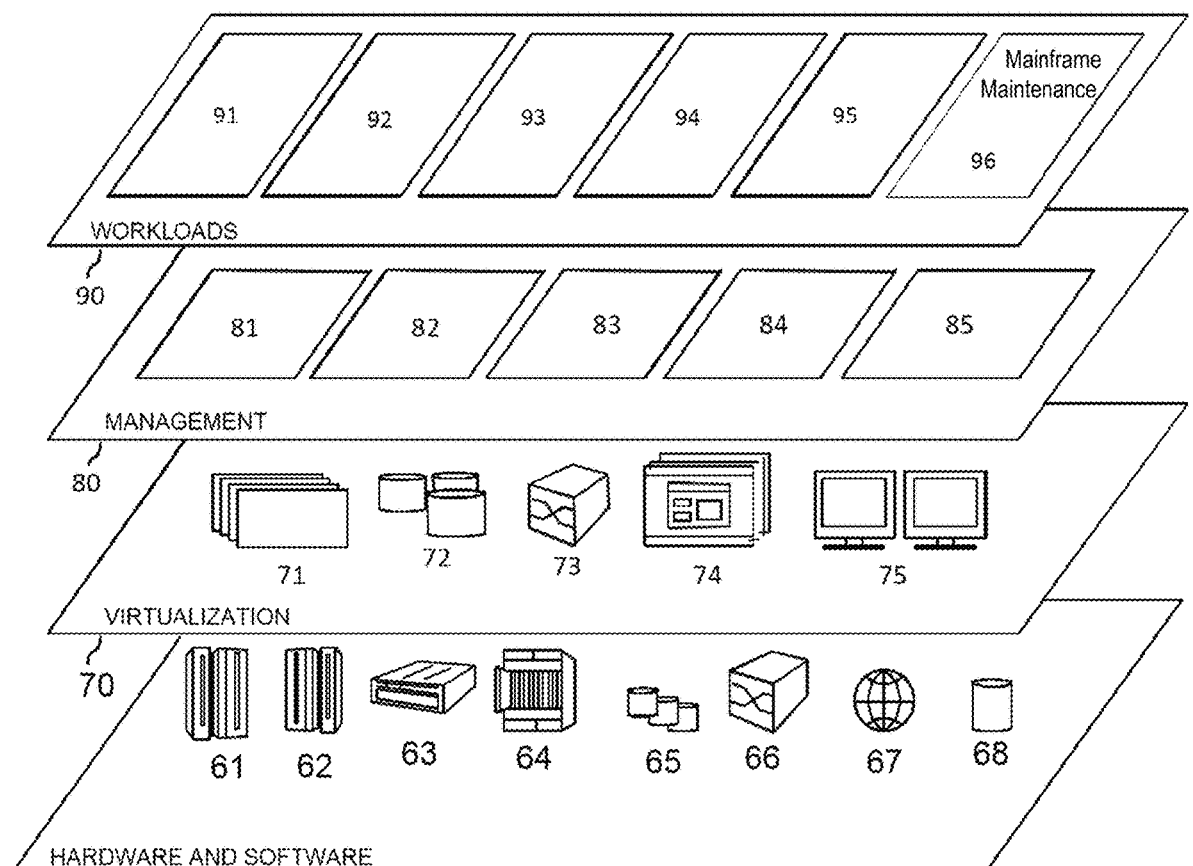
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mainframe maintenance 96.

Implementations of the invention may include a computer system/server 12 of FIG. 1 in which one or more of the program modules 42 are configured to perform (or cause the computer system/server 12 to perform) one of more functions of the mainframe maintenance 96 of FIG. 3. For example, the one or more of the program modules 42 may be configured to: automatically generate a time series dataset based on catalog data from a mainframe catalog of a mainframe database; train a database maintenance task classification machine learning (ML) model by correlating historic performance related metrics of the time series dataset with a historic maintenance data profile of the time series dataset utilizing a first classification machine learning technique; train a database maintenance triggering ML model with the historic performance related metrics of the time series dataset and the historic maintenance data profile from the time series dataset utilizing a first regression machine learning technique; obtain real-time performance metrics of a mainframe database; automatically generate a predicted maintenance task as an output of the trained database maintenance task classification ML model based on an input of the real-time performance metrics; automatically generate a time to execute the predicted maintenance task as an output of a trained database maintenance triggering ML model based on an input of the predicted maintenance task and the real-time performance metrics; automatically generate maintenance task instructions for the mainframe database based on the predicted maintenance task, the time to execute the predicted maintenance task, and a maintenance profile of the mainframe database; and automatically initiate the execution of the maintenance task instructions by the mainframe database.

Figure 4:
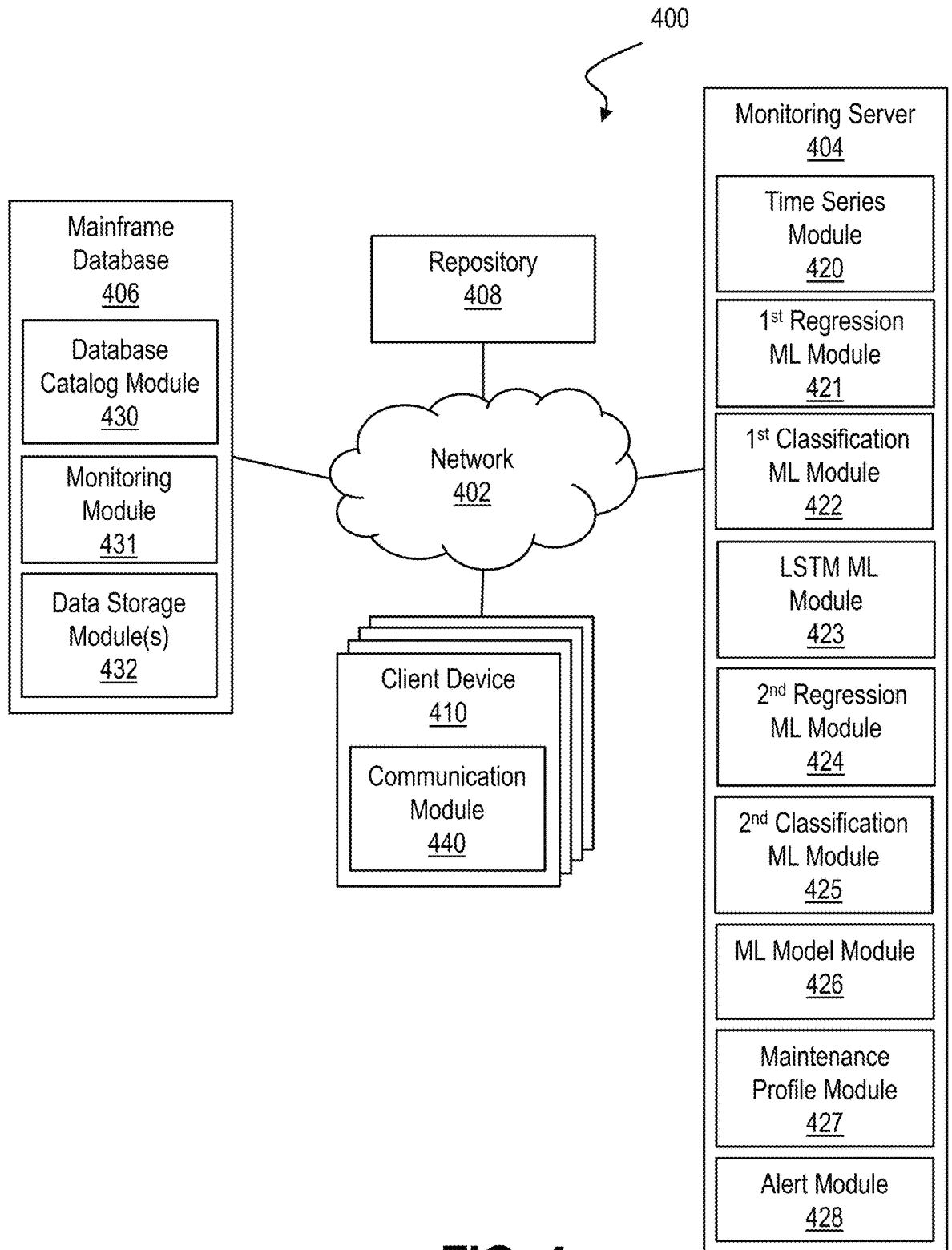
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 402 enabling communication between one or more of: a monitoring server 404, a mainframe database 406, a repository 408 and one or more client devices 410. The monitoring server 404, the mainframe database 406, the repository 408 and each of the one or more client devices 410 may each comprise the computer system/server 12 of FIG. 1, or elements thereof. In embodiments, the monitoring server 404, the mainframe database 406, the repository 408 and each of the one or more client devices 410 may each be computing nodes 10 in the cloud computing environment 50 of FIG. 2. For example, the one or more client devices 410 may be local computing devices used by cloud consumers in the cloud computing environment 50 of FIG. 2 (e.g., PDA or cellular telephone 54A, desktop computer 54B, laptop computer 54C, and/or automobile computer system 54N). In embodiments, the monitoring server 404 comprises a cloud service provider in the cloud computing environment 50 of FIG. 2, configured to provide automated data maintenance services to clients in the cloud computing environment 50.

In embodiments, the monitoring server 404 comprises one or more modules, each of which may comprise one or more program modules such as program modules 42 described with respect to FIG. 1. In the example of FIG. 4, the monitoring server 404 includes a time series module 420, a first regression machine learning module 421, a first classification ML module 422, a long short-term memory (LSTM) ML module 423, a second regression ML module 424, and a second classification ML module 425 for training a plurality of ML models in an ML model module 426, a maintenance profile module 427 and an alert module 428 (each of which may comprise one or more program module (s) 42 of FIG. 1, for example).

In implementations, the time series module 420 is configured to receive historic performance related metrics (data) from a mainframe database catalog (e.g., from a catalog in the database catalog module 430 of the mainframe database 406).

In implementations, the ML model module 426 is configured to input data to a ML models to obtain outputs for use in managing and maintaining the mainframe database 406. In embodiments, the ML models in the ML model module 426 include: (1) a database monitor anomaly detection model; (2) a database maintenance task classification model; (3) a database failure prediction model; (4) a database maintenance triggering model; and (4) the database maintenance failure profile model.

In embodiments, the maintenance profile module 427 is configured to use a predicted maintenance task and an ideal start time to generate a maintenance task (task instructions) based on maintenance profile information for the mainframe database 406. In aspects, the maintenance profile module 427 is further configured to initiate execution of the maintenance task at the mainframe database 406.

In implementations, the alert module 428 is configured to generate alerts and/or notifications and provide the alerts or notifications to one or more client devices 410. Alerts or notifications may be sent when an anomalous behavior is detected, or when a recovery profile is suggested, for example.

In embodiments, the mainframe database 406 comprises one or more modules, each of which may comprise one or more program modules such as program modules 42 described with respect to FIG. 1. In the example of FIG. 4, the mainframe database 406 includes a database catalog module 430, a monitoring module 431 and one or more data storage modules 432 (each of which may comprise one or more program module(s) 42 of FIG. 1, for example).

In implementations the database catalog module 430 includes a catalog, and is configured to gather historic performance related metrics (data) and provide the data to the monitoring server 404 for use in training a plurality of ML models in the ML model module 426. In general, a catalog describes data set attributes and indicates the volumes on which a data set is located. Along with common information, a database catalog also holds metadata on every database, such as how many tables and rows are being used in a particular database. In embodiments, the monitoring module 431 is configured to monitor performance related metric (data), and record the data for access by the database catalog module 430.

In implementations, the one or more client devices 410 include a communication module 440 enabling the communication of data between the one or more client devices 410 and the monitoring server 404. In implementations, the communication module 440 provides clients with access to a user interface of the monitoring server, by which the monitoring server 404 may communicate alerts or notifications to the clients.

The monitoring server 404, mainframe database 406, repository 408 and one or more client devices 410 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
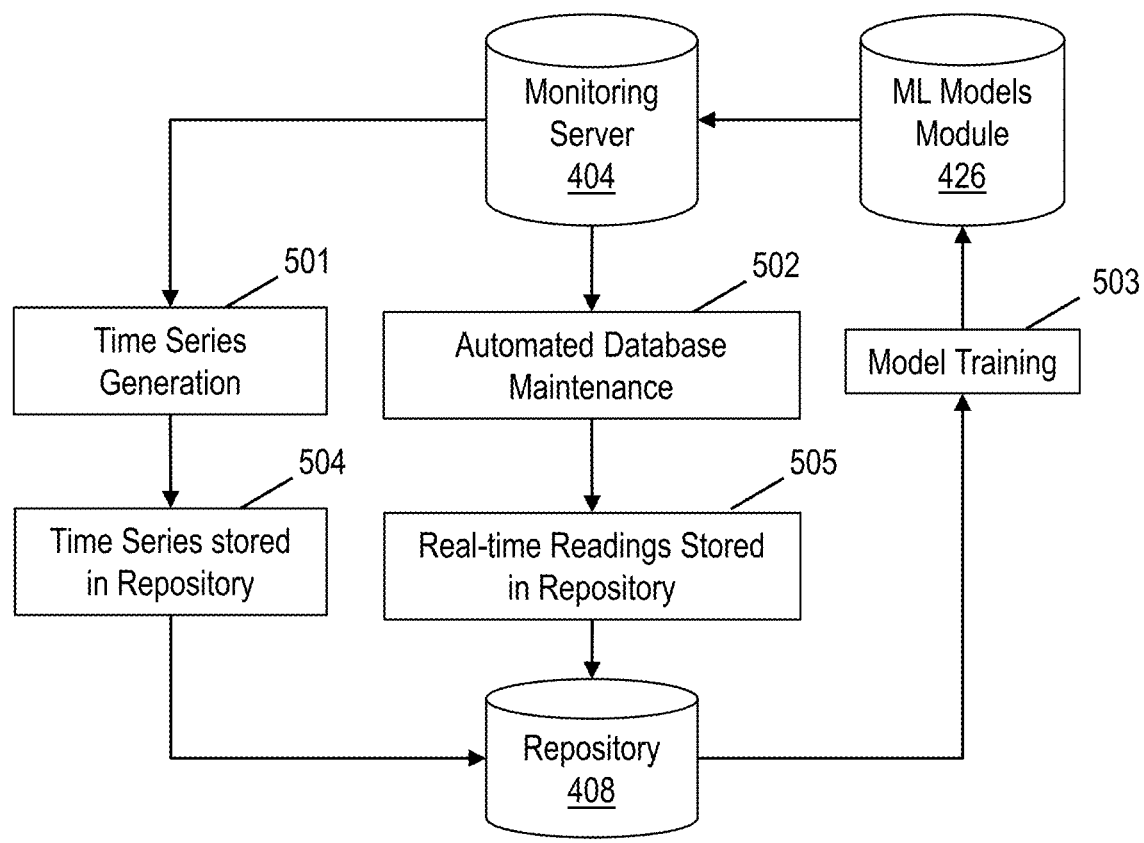
FIG. 5 shows an overview of three main processes performed in accordance with aspects of the invention.

FIG. 5 shows an overview of three main processes performed in accordance with aspects of the invention. In implementations, the monitoring server 404 is configured to generate time series data as indicated at 501, perform automated database maintenance as indicated at 502, and perform model training as indicated at 503. In embodiments, time series data generated at 501 is stored in the repository 408, as indicated at 504. Additionally, at step 505 real-time readings of performance related metrics (data) may be stored in the repository 408 after the automated database maintenance is performed at 502, wherein the real-time readings provide insights for model training at 503. It should be understood that model training 503 may be an iterative process whereby ML models in the ML models module 426 are trained and updated over time based on changes in the repository 408.

FIG. 6 depicts an exemplary time series dataset 600 in accordance with aspects of the invention. In the example of FIG. 6, a time series dataset 600 includes columns 601-608 of real-time performance related variables or parameters and columns 609-612 of additional labeled data added by the monitoring server 404. The time series dataset 600 also includes rows 621-634 indicating parameter values or metrics at a particular time. Specifically, FIG. 6 shows parameters including: real-time performance variables 1-8 (601-608); maintenance data profile 609; maintenance profile start time 610; failures 611; and recovery data profile 612.

Figure 7:
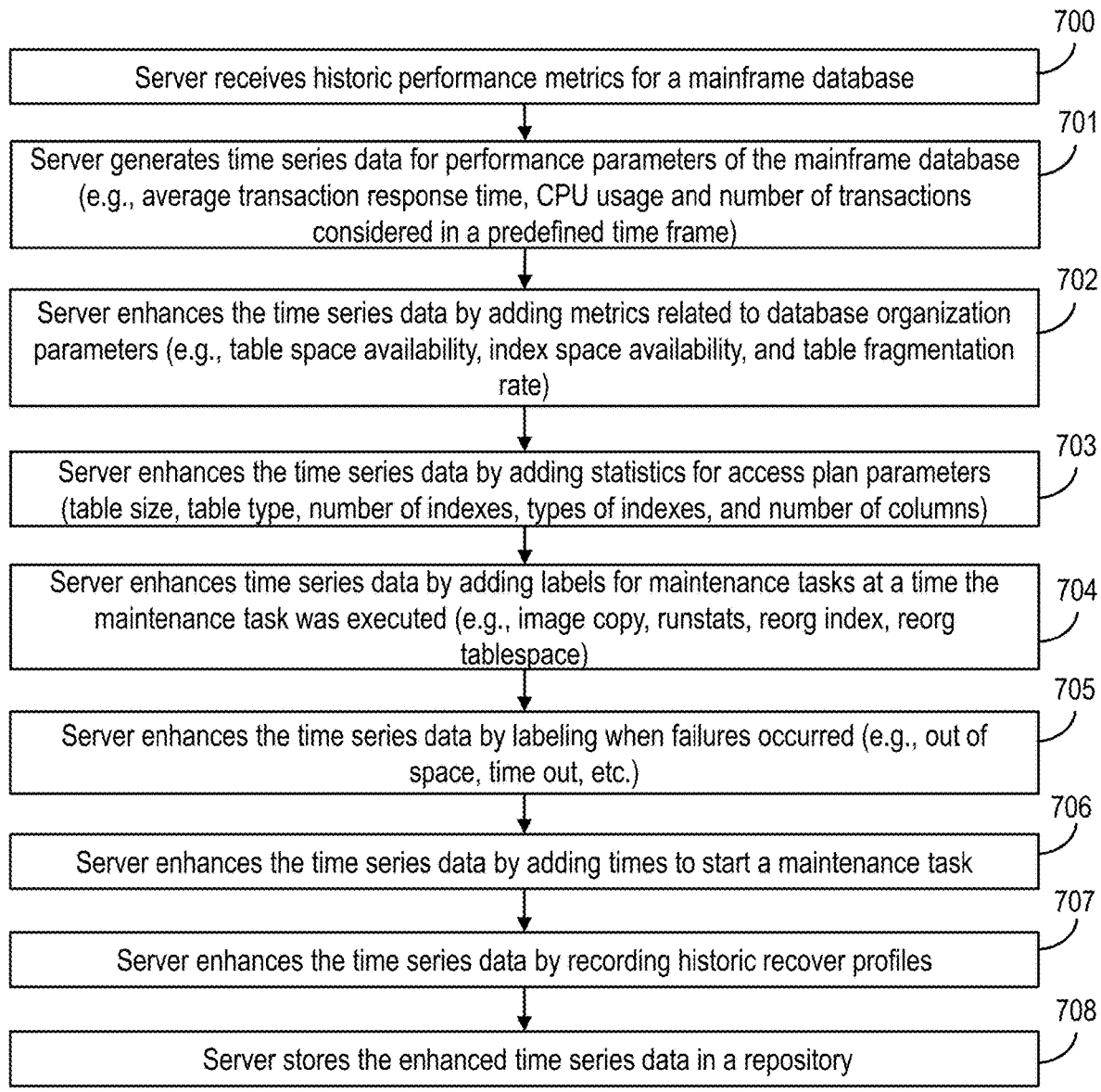
FIG. 7 shows a flowchart of an exemplary method of generating time series data in accordance with aspects of the invention.

FIG. 7 shows a flowchart of an exemplary method of generating time series data in accordance with aspects of the invention. Steps of the method may be carried out in the environment of FIG. 4 and are described with reference to elements depicted in FIG. 4.

At step 700, the monitoring server 404 receives historic performance metrics (data) for a mainframe database 406 to be maintained. The monitoring server 404 may obtain the historic performance metrics directly from a catalog of the mainframe database 406 (e.g., via the database catalog module 430). In embodiments, the monitoring server 404 collects performance metrics from a performance monitor (e.g., the monitoring module 431) of the mainframe database 406 and from a database catalog (e.g., of the database catalog module 430) using a software application, in order to create a historic timeline with regular behavior of the mainframe database 406. In implementations, the monitoring server 404 obtains the historic performance metrics via an application programming interface (API) tool. In embodiments, the time series module 420 of the monitoring server 404 implements step 700.

At step 701, the monitoring server 404 generates a time series dataset of performance parameters (e.g., variables) of the mainframe database 406 based on the historic performance metrics obtained at step 700. See, for example, variables v1-v8 in columns 601-608 of FIG. 6. Variables may include, for example, average transaction response time, central processing unit (CPU) usage, and number of transactions considering a predefined time rate or time frame. In aspects, the term performance parameters refers to parameters regarding how a mainframe database 406 performs functions over time. In implementations, the time series dataset contains collected data with respect to usual behavior of the mainframe database 406 (e.g., variables related to the mainframe database 406 performance). In implementations, the term time series dataset refers to a series of data points indexed, listed or graphed in time order, which track parameters over time. In embodiments, the term time series dataset as used herein refers to a dataset including columns of time series variables and rows of data at a particular time. See for example, the time series dataset 600 of FIG. 6. Various methods of generating time series datasets may be utilized by the monitoring server 404, and the method and particular format of the time series dataset are not intended to be limited by any examples herein. In embodiments, the time series module 420 of the monitoring server 404 implements step 701.

At step 702, the monitoring server 404 enhances the time series dataset by adding metrics related to database organization parameters. In embodiments, the metrics related to database organization parameters include one or more of: table space availability, index space availability, and table fragmentation rate. In embodiments, the time series module 420 of the monitoring server 404 implements step 702.

At step 703, the monitoring server 404 enhances the time series dataset by adding statistics for access plan parameters. In embodiments, the statistics for access plan parameters include one or more of: table size, table type, number of indexes, types of indexes, and number of columns. In embodiments, the time series module 420 of the monitoring server 404 implements step 703.

At step 704, the monitoring server 404 enhances the time series dataset by adding labels for maintenance tasks at a time the maintenance task was executed. Examples of maintenance tasks include, for example, image copy, runstats, reorg index, reorg tablespace, and others. In general, an IMAGECOPY command enables local and recovery site image copies to be made after making and registering a primary copy. In general, a RUNSTATS command updates statistics in a system catalog about characteristics of a table, associated indexes, or statistical views. These characteristics include, for example, number of records, number of pages, and average record length. In general, a REORG INDEXES command reorganizes indexes or tables. In general, a REORG TABLESPACE command reorganizes a table space, partition, or range of partitions to reclaim fragmented space and improve access performance. In implementations, the monitoring server 404 labels the time-series readings by computing the maintenance task DAT profile executed at a given time. In aspects, the addition of the maintenance task data creates a historic maintenance data profile for the mainframe database in the time series dataset. See for example, column 609 of FIG. 6, indicating maintenance tasks executed at times associated with rows 624, 629 and 634. In embodiments, the time series module 420 of the monitoring server 404 implements step 704.

At step 705, the monitoring server 404 enhances the time series dataset by adding labels to the time series dataset indicating when one or more failures occurred. Failures may happen when a system is out of space, or a task is timed out, for example. In implementations, if a database failure occurred at a given time in the past, the variables that describe the mainframe database system are labelled with "one," otherwise, they are labelled with "zero." See for example, column 611 of FIG. 6, indicating failures at times associated with rows 626 and 630. In aspects, the addition of the labeling indicating when one or more failures occurred creates a historic failure data profile for the mainframe database in the time series dataset (e.g., column 611 of FIG. 6). In embodiments, the time series module 420 of the monitoring server 404 implements step 705.

At step 706, the monitoring server 404 enhances the time series dataset by adding times to start a maintenance task. In implementations, the monitoring server 404 adds a time in the past when a maintenance DAT profile was executed by a database administrator according to a business rule. See for example, column 610 of FIG. 6, indicating maintenance tasks were executed at times t1, t2 and t3. In embodiments, the time series module 420 of the monitoring server 404 implements step 706.

At step 707, the monitoring server 404 enhances the time series dataset by recording historic recovery events of the mainframe database 406. In embodiments, the monitoring server 404 adds a recovery DAT profile executed to recover from a failure. See for example, column 612 of FIG. 6, indicating historic recovery profiles p1 and p2 associated with failures at rows 626 and 630. In aspects, the addition of the historic recovery event data creates a historic recovery profile for the mainframe database in the time series dataset (e.g., column 611 of FIG. 6). In embodiments, the time series module 420 of the monitoring server 404 implements step 707.

At step 708, the monitoring server 404 stores the enhanced time series dataset in the repository 408, wherein it can be accessed by the monitoring server 404 for the purpose of training ML models, as discussed below with respect to FIG. 8. In embodiments, the monitoring server 404 may generate unique time series datasets for different mainframe databases (e.g., mainframe database 406). In implementations, each mainframe database will have different enhancements performed on its time series dataset (e.g., based on different database organization parameters, recover data profiles, etc.). Thus, each time series dataset may be customized for the particular mainframe database 406. In implementations, the time series dataset generation of FIG. 7 is performed automatically by the monitoring server 404 without manual input of a user(s).

Figure 8:
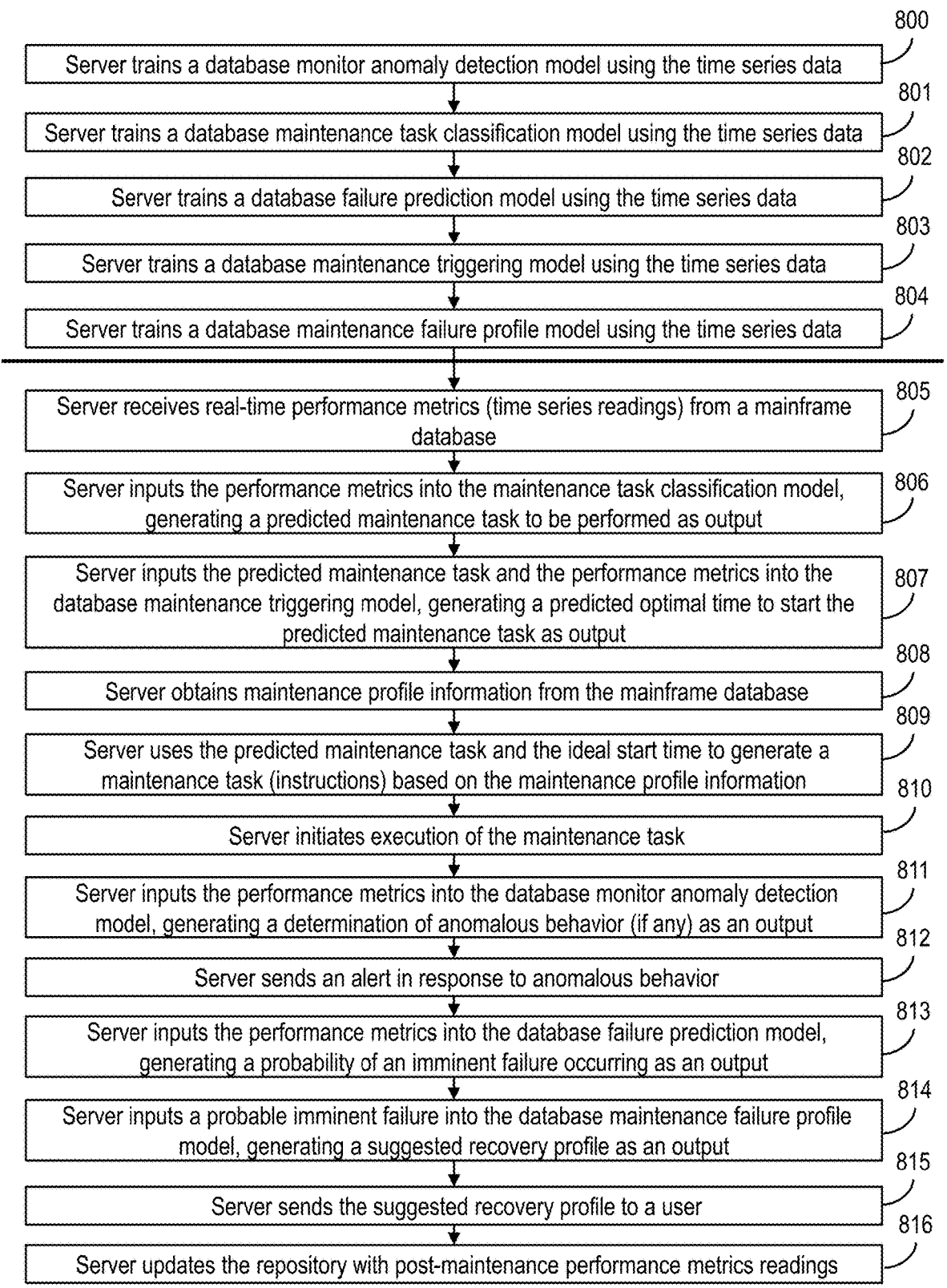
FIG. 8 shows a flowchart of exemplary model training and automated maintenance processes in accordance with aspects of the invention.

FIG. 8 shows a flowchart of exemplary model training and automated maintenance processes in accordance with aspects of the invention. Steps of FIG. 8 may be carried out in the environment of FIG. 4 and are described with reference to elements depicted in FIG. 4.

At step 800, the monitoring server 404 trains the database monitor anomaly detection model using the time series dataset generated for the mainframe database 406 and stored in the repository 408 (as described in FIG. 7). In embodiments, the first regression ML module 421 is configured to train the database monitor anomaly detection model using historic performance related metrics in the time series dataset. Various regression techniques may be utilized by the first regression ML module 421, such as support vector regression, neural networks, decision trees, k-nearest neighbors, and others. In implementations, the training of the database monitor anomaly detection model considers three sets of time-series historical variables: (i) variables related to a mainframe performance (e.g., average transaction response time, CPU usage, and number of transactions considered in a predefined time period); (ii) variables related to an organizational database aspect (e.g., table space availability, index space availability, and table fragmentation rate); and (iii) variables related to access plans (e.g., table size, table type, number of indexes, types of indexes, and number of columns). Exemplary variables are referenced in the enhancement steps 701, 702 and 703 of FIG. 7.

At step 801, the monitoring server 404 trains a database maintenance task classification model using the time series dataset of FIG. 7. In embodiments, the first classification ML module 422 is configured to train the database maintenance task classification model using the historic performance related metrics in the time series dataset. Various classification ML techniques may be utilized by the first classification ML module 422, including gaussian, naive bayes, neural networks, support vector machines, decision trees, k-nearest neighbors, and others. In implementations, the training of the database maintenance task classification model correlates the three sets of time-series historical variables ((i) variables related to a mainframe performance; (ii) variables related to an organizational database aspect; and (iii) variables related to access plans) with a historical maintenance data profile of the mainframe database 406 (i.e., the maintenance tasks at the time they were executed). Some exemplary variables of the historical maintenance data profile at issue are referenced in the enhancement step 704 of FIG. 7.

At step 802, the monitoring server 404 trains a database failure prediction model using the time series dataset of FIG. 7. In implementations, the LSTM ML module 423 is configured to train the database failure prediction model using the historic performance related metrics in the time series dataset. In implementations, the database failure prediction model correlates the three sets of time-series historical variables ((i) variables related to a mainframe performance; (ii) variables related to an organizational database aspect; and (iii) variables related to access plans) with data indicating if a database failure occurred in the past. Some exemplary failure-related variables are referenced in the enhancement step 705 of FIG. 7.

At step 803, the monitoring server 404 trains a database maintenance triggering model using the time series dataset of FIG. 7. In embodiments, the second regression ML module 424 is configured to train the database maintenance triggering model using the historic performance related metrics in the time series dataset. Various regression techniques may be utilized by the second regression ML module 424, such as support vector regression, neural networks, decision trees, k-nearest neighbors, and others. In implementations, the training of the database maintenance triggering model correlates the three sets of time-series historical variables ((i) variables related to a mainframe performance; (ii) variables related to an organizational database aspect; and (iii) variables related to access plans) and the historic maintenance data profile with variables that indicate a time in the past a maintenance data profile was executed. Some exemplary failure-related variables are referenced in the enhancement step 705 of FIG. 7. The historic maintenance data profile is discussed above with respect to step 706 of FIG. 7.

At step 804, the monitoring server 404 trains a database maintenance failure profile model using the time series dataset of FIG. 7. In implementations, the second classification ML module 425 is configured to train the database maintenance failure profile model using the historic performance related metrics in the time series dataset. Various classification ML techniques may be utilized by the second classification ML module 425, including gaussian, naive bayes, neural networks, support vector machines, decision trees, k-nearest neighbors, and others. In implementations, the monitoring server 404 partitions the time series readings (of the historic performance related metrics) to obtain readings related with historic failures using the variable (labeling indicating when a failure occurred) computed at step 705 of FIG. 7. In implementations, the training of the database maintenance failure profile model correlates the three sets of time-series historical variables ((i) variables related to a mainframe performance; (ii) variables related to an organizational database aspect; and (iii) variables related to access plans) with the variable (a historic recovery profile executed to recover from a failure that occurred) computed at step 706 of FIG. 7.

In implementations, steps 800-804 of FIG. 8 are part of the model training process 503 of the monitoring server 404. It should be understood that the model training process 503 described may be performed periodically or continuously based on the receipt of new historic performance related metrics in the time series dataset. That is, the time series dataset for a mainframe database 406 may be continuously or periodically updated based on incoming historic performance related metrics, and the updated time series dataset utilized to iteratively train ML models according to embodiments of the invention to produce more accurate outputs over time.

In embodiments, the automated database maintenance process 502 includes one or more of steps 805-816 of FIG. 8. At step 805, the monitoring server 404 receives real-time performance metrics (time series readings) from the mainframe database 406 (e.g., from monitoring module 431). In implementations, the time series readings include three sets of time-series historical variables including: (i) variables related to a mainframe performance, (ii) variables related to an organizational database aspect, and (iii) variables related to access plans. In embodiments, the time series module 420 of the monitoring server 404 implements step 805.

At step 806, the monitoring server 404 inputs the real-time performance metrics into the maintenance task classification model, generating a predicted maintenance task to be performed (maintenance data profile to be executed) as an output of the maintenance task classification model. In embodiments, the ML model module 426 of the monitoring server 404 implements step 806.

At step 807, the monitoring server 404 inputs the predicted maintenance task determined at step 806 and the real-time performance metrics into the database maintenance triggering model, generating a predicted optimal time to start (execute) the predicted maintenance task as an output of the database maintenance triggering model. In embodiments, the ML model module 426 of the monitoring server 404 implements step 807.

At step 808, the monitoring server 404 obtains maintenance profile information from the mainframe database 406. The term maintenance profile information refers to information regarding maintenance functions executed at the mainframe database 406, including for example, the functions performed and the reasons for the performance of the functions. In embodiments, the maintenance profile module 426 of the monitoring server 404 implements step 808.

At step 809, the monitoring server 404 uses the predicted maintenance task and the ideal start time to generate a maintenance task (task instructions) based on the maintenance profile information. In embodiments, the maintenance profile module 427 of the monitoring server 404 implements step 809.

At step 810, the monitoring server 404 initiates execution of the maintenance task generated at step 809. In implementations, the monitoring server 404 runs a data analytics tool (DAT) for generating profiles based on predefined profiles according to the maintenance task determined at step 806 and the start time determined at step 807. In embodiments, the monitoring server 404 runs an open platform communications (OPC) task that executes the output of the DAT profile run. In implementations, the monitoring server 404 runs the OPC task into a mainframe scheduler of the mainframe database 406 by executing the output of the DAT profile run. In aspects of the invention, the maintenance profile module 427 of the monitoring server 404 implements step 810.

At step 811, the monitoring server 404 inputs the real-time performance metrics into the database monitor anomaly detection model, generating a determination of anomalous behavior (if any) as an output of the model. In implementations, the database monitor anomaly detection model is configured to determine if readings (performance metrics) received are related to an unpredicted behavior of the mainframe database 406. In embodiments, this anomalous behavior is detected by predicting a number of readings to be received and comparing the predicted number to an actual number of readings received. In implementations, if a difference between the expected or predicted number of readings and the number of actual readings is greater than a predetermined threshold value, the monitoring server 404 determines that an anomalous or unpredicted behavior has occurred, and the database administrator may be notified. In embodiments, the ML model module 426 of the monitoring server 404 implements step 811.

At step 812, the monitoring server 404 sends an alert or notification in response to anomalous behavior detected at step 811. In one example, an alert or notification is sent to a client device 410 by the alert module 428 of the monitoring server 404.

At step 813, the monitoring server 404 inputs the real-time performance metrics into the database failure prediction model, generating a probability (probability value) of an imminent failure occurring as an output of the model. In implementations, the closer an output value (provability value) is to 1, the higher the probability of an imminent failure occurring. In embodiments, the ML model module 426 of the monitoring server 404 implements step 813.

At step 814, the monitoring server 404 inputs a probable imminent failure (determined at step 813) into the database maintenance failure profile model, generating a suggested recovery profile (e.g., most adequate failure DAT profile) as an output of the database maintenance failure profile model. In embodiments, the ML model module 426 of the monitoring server 404 implements step 814.

At step 815, the monitoring server 404 sends the suggested recovery profile determined at step 814 to a user (e.g., system administrator). In implementations, the alert module 428 sends an alert or notification with the suggested recovery profile to a client device 410 of a user.

At step 816, the monitoring server 404 updates the repository with post-maintenance performance metrics readings. In embodiments, the time series module 420 of the monitoring server 404 implements step 816.

In implementations, the above-described automated database maintenance process 502 may be provided as a cloud service to organization. In one example, a client is an airline company that cannot stop their mainframe database system at any time, as its operation is spread out on the globe at major airports in the world, selling tickets and managing the logistics for their operations. Thus, the client is not able to have a timeframe maintenance window within which all maintenance tasks may be performed. In this case, the monitoring server 404 may utilize the automated database maintenance process 502 to provide pin-point anomaly detection services, and to automatically address maintenance issues and improve performance at an object level, thus keeping the whole system at top levels of health at all times. Beyond preventative maintenance, the automated database maintenance process 502 of the present invention may be utilized to automatically and immediately fix any failure, as the AI of the monitoring server 404 (e.g., ML models in the ML model module 426) is continuously monitoring and applying proper database utilities as required. In contrast to current systems that require a support team to be engaged to understand, prepare to address, and apply a solution to a system anomaly (e.g., failure), embodiment of the invention provides a real-time solution to automatically address a system anomaly.

In another example, a client utilizes a huge mainframe environment having more than 200 database instances supporting the client. In such a scenario, the mainframe system cannot be stopped, as the mainframe operation is a continuous (24×7) application spread out over the globe. Current maintenance methods include running pre-selected lists of objects, scheduled by time rules. Implementations of the invention instead allow for real-time automated actions to address maintenance issues as they arise.

Figure 9:
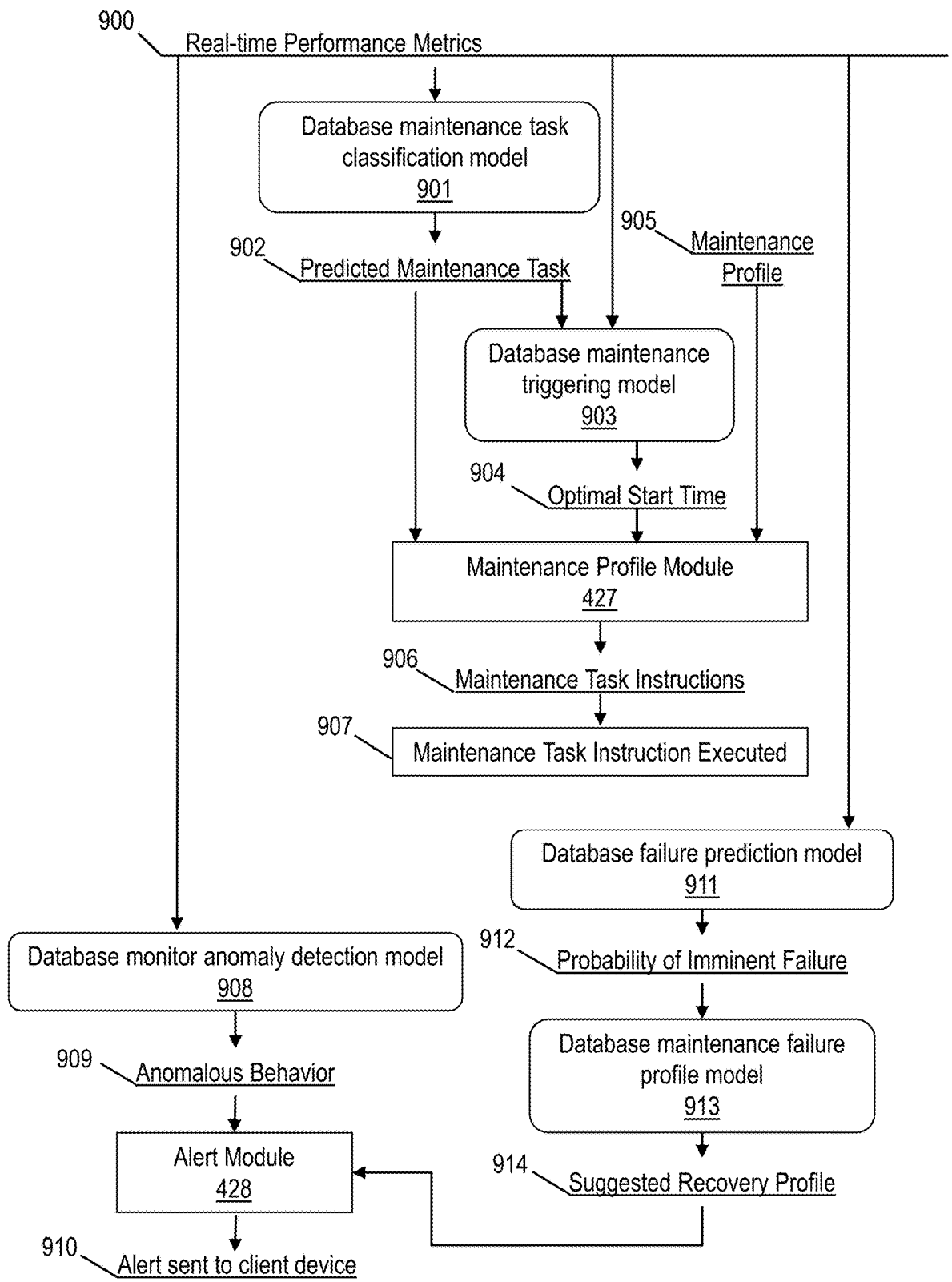
FIG. 9 depicts an exemplary use scenario in accordance with aspects of the invention.

FIG. 9 depicts an exemplary use scenario in accordance with aspects of the invention. Steps of FIG. 9 may be carried out in the environment of FIG. 4 in accordance with FIG. 8, and are described with reference to elements depicted in FIG. 4. Real-time performance metrics 900 for a mainframe database 406, including average transaction response time, CPU usage and number of transactions considering a predefined time period, are obtained by the monitoring server 404 and fed through a database maintenance task classification model 901 by the ML model module 426. The database maintenance task classification model 901 generates a predicted maintenance task 902 as an output. The predicted maintenance task 902 and the real-time performance metrics 900 are then fed to a database maintenance triggering model 903 by the ML model module 426, which generates an optimal start time 904 as an output. The predicted maintenance task 902 and the optimal start time 904 are then fed to the maintenance profile module 427, along with a maintenance profile 905 of the mainframe database 406, and the maintenance profile module 427 generates maintenance task instructions 906 to implement the predicted maintenance task to address a maintenance issue. The monitoring server 404 causes the maintenance task instructions to execute at 907.

Real-time performance metrics 900 are also fed to a database monitor anomaly detection model 908, which outputs any detected anomalous behavior 909. A detected anomalous behavior 909 is fed to an alert module 428, which generates appropriate content for an alert based on the anomalous behavior 909 and sends an alert to a client device at 910.

Real-time performance metrics 900 are additionally fed to a database failure prediction model 911, which outputs a probability value indicating the probability of an imminent failure 912. If the monitoring server 404 determines a failure is imminent based on the probability value, the predicted failure is fed to a database maintenance failure profile model 913, which outputs a suggested recovery profile 914 to address the predicted failure. In implementations, the suggested recovery profile 914 is sent to the alert module 428, and an alert 910 is sent to a user indicating the suggested recovery profile 914 for the determined imminent failure.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, by a computing device, real-time performance metrics of a mainframe database;
obtaining, by the computing device, the real-time performance metrics of the mainframe database based on the monitoring of the real-time performance metrics;
automatically generating, by the computing device, a predicted maintenance task as an output of a trained database maintenance task classification machine learning (ML) model based on an input of the real-time performance metrics;
automatically generating, by the computing device, a time to execute the predicted maintenance task as an output of a trained database maintenance triggering ML model based on an input of the predicted maintenance task and the real-time performance metrics;
automatically generating, by the computing device, maintenance task instructions for the mainframe database based on the predicted maintenance task, the time to execute the predicted maintenance task, and a maintenance profile of the mainframe database;
automatically initiating, by the computing device, the execution of the maintenance task instructions by the mainframe database;
automatically generating, by the computing device, a determination of an anomalous behavior as an output of a trained database monitor anomaly detection ML model based on determining that the real-time performance metrics are an unpredicted behavior of the mainframe database, wherein the trained database monitor anomaly detection ML model is trained with historic performance related metrics of a time series dataset by utilizing a support vector regression algorithm; and
automatically sending, by the computing device, an alert indicating the anomalous behavior to a remote client device via a network connection.

2. The method of claim 1, wherein:
the database maintenance task classification ML model is trained by correlating the historic performance related metrics of a time series dataset with a historic maintenance data profile of the time series dataset utilizing a first classification machine learning technique; and
the database maintenance triggering ML model is trained with the historic performance related metrics of the time series dataset and the historic maintenance data profile of the time series dataset utilizing a first regression machine learning technique.

3. The method of claim 2, wherein, the historic performance related metrics include the following three sets of time-series historical variables: variables related to a mainframe performance, variables related to an organizational database aspect, and variables related to access plans.

4. The method of claim 3, wherein:
the variables related to a mainframe performance include: average transaction response time, central processing unit (CPU) usage, and number of transactions considered in a predefined time period;
the variables related to an organizational database aspect include: table space availability, index space availability, and table fragmentation rate; and
the variables related to access plans include: table size, table type, number of indexes, types of indexes, and number of columns.

5. The method of claim 1, further comprising;
automatically generating, by the computing device, a probability value of an imminent failure as an output of a trained database maintenance failure profile ML model based on an input of the real-time performance metrics, wherein the database maintenance failure profile ML model is trained by correlating the historic performance related metrics of the time series dataset with a historic failure data profile of the time series dataset utilizing a second classification ML technique;
automatically determining, by the computing device, an imminent failure in response to determining that the probability value is greater than a predetermined failure threshold value;
automatically generating, by the computing device, a suggested recovery profile as an output of a trained database maintenance failure profile ML model based on an input of the imminent failure, wherein the database maintenance failure profile ML model is trained by correlating the historic performance related metrics of the time series dataset with a historic recovery profile of the time series data; and automatically sending, by the computing device, the suggested recovery profile to a remote client device of a user via a network connection.

6. The method of claim 1, further comprising performing the training of the database maintenance task classification ML model and the database maintenance triggering ML model.

7. The method of claim 1, further comprising automatically generating, by the computing device, the time series dataset based on catalog data from a mainframe catalog of the mainframe database.

8. The method of claim 1, wherein the maintenance task instructions are executed without a requirement to restart the mainframe database.

9. A computer program product comprising one or more computer readable storage media having program instructions collectively stored on the one or more computer readable storage media, the program instructions executable to:

monitor real-time performance metrics of a mainframe database;

obtain the real-time performance metrics of the mainframe database based on the monitoring of the real-time performance metrics;

automatically generate a predicted maintenance task as an output of a trained database maintenance task classification machine learning (ML) model based on an input of the real-time performance metrics;

automatically generate a time to execute the predicted maintenance task as an output of a trained database maintenance triggering ML model based on an input of the predicted maintenance task and the real-time performance metrics;

automatically generate maintenance task instructions for the mainframe database based on the predicted maintenance task, the time to execute the predicted maintenance task, and a maintenance profile of the mainframe database;

automatically initiate the execution of the maintenance task instructions by the mainframe database;

automatically generate a determination of an anomalous behavior as an output of a trained database monitor anomaly detection ML model based on determining that the real-time performance metrics are an unpredicted behavior of the mainframe database, wherein the trained database monitor anomaly detection ML model is trained with historic performance related metrics of a time series dataset by utilizing a support vector regression algorithm; and automatically send an alert indicating the anomalous behavior to a remote client device via a network connection.

10. The computer program product of claim 9, wherein:

the database maintenance task classification ML model is trained by correlating the historic performance related metrics of a time series dataset with a historic maintenance data profile of the time series dataset utilizing a first classification machine learning technique; and the database maintenance triggering ML model is trained with the historic performance related metrics of the time series dataset and the historic maintenance data profile of the time series dataset utilizing a first regression machine learning technique.

11. The computer program product of claim 10, wherein the historic performance related metrics include the following three sets of time-series historical variables:

variables related to a mainframe performance, variables related to an organizational database aspect, and variables related to access plans.

12. The computer program product of claim 11, wherein:

the variables related to a mainframe performance include are selected from one or more of the group consisting of: average transaction response time, central processing unit (CPU) usage, and number of transactions considered in a predefined time period;

the variables related to an organizational database aspect are selected from one or more of the group consisting of: table space availability, index space availability, and table fragmentation rate; and the variables related to access plans are selected from one or more of the group consisting of: table size, table type, number of indexes, types of indexes, and number of columns.

13. The computer program product of claim 9, wherein the program instructions are further executable to:

automatically generate a probability value of an imminent failure as an output of a trained database maintenance failure profile ML model based on an input of the real-time performance metrics, wherein the database maintenance failure profile ML model is trained by correlating the historic performance related metrics of the time series dataset with a historic failure data profile of the time series dataset utilizing a second classification ML technique;

automatically determine an imminent failure in response to determining that the probability value is greater than a predetermined failure threshold value;

automatically generate a suggested recovery profile as an output of a trained database maintenance failure profile ML model based on an input of the imminent failure, wherein the database maintenance failure profile ML model is trained by correlating the historic performance related metrics of the time series dataset with a historic recovery profile of the time series data; and automatically send the suggested recovery profile to a remote client device of a user via a network connection.

14. The computer program product of claim 9, wherein the program instructions are further executable to perform the training of the database maintenance task classification ML model and the database maintenance triggering ML model.

15. The computer program product of claim 9, wherein the program instructions are further executable to automatically generate the time series dataset based on catalog data from a mainframe catalog of the mainframe database.

16. A system comprising:

a processor, a computer readable memory, one or more computer readable storage media, and program instructions collectively stored on the one or more computer readable storage media, the program instructions executable to:

monitor real-time performance metrics of a mainframe database;

obtain the real-time performance metrics of mainframe database based on the monitoring of the real-time performance metrics;

automatically generate a predicted maintenance task as an output of the trained database maintenance task classification ML model based on an input of the real-time performance metrics;

automatically generate a time to execute the predicted maintenance task as an output of a trained database maintenance triggering ML model based on an input of the predicted maintenance task and the real-time performance metrics;

automatically generate maintenance task instructions for the mainframe database based on the predicted maintenance task, the time to execute the predicted maintenance task, and a maintenance profile of the mainframe database;

automatically initiate the execution of the maintenance task instructions by the mainframe database;

automatically generate a determination of an anomalous behavior as an output of a trained database monitor anomaly detection ML model based on determining that the real-time performance metrics are an unpredicted behavior of the mainframe database, wherein the trained database monitor anomaly detection ML model is trained with historic performance related metrics of a time series dataset by utilizing a support vector regression algorithm; and automatically send an alert indicating the anomalous behavior to a remote client device via a network connection.

17. The system of claim 16, wherein:

automatically generate a time series dataset based on catalog data from a mainframe catalog of the mainframe database;

train the database maintenance task classification machine learning (ML) model by correlating the historic performance related metrics of the time series dataset with a historic maintenance data profile of the time series dataset utilizing a first classification machine learning technique; and train the database maintenance triggering ML model with the historic performance related metrics of the time series dataset and the historic maintenance data profile of the time series dataset utilizing a first regression machine learning technique, wherein the historic performance related metrics include the following three sets of time-series historical variables: variables related to a mainframe performance, variables related to an organizational database aspect, and variables related to access plans.

18. The system of claim 17, wherein the program instructions are further executable to:

automatically generate a probability value of an imminent failure as an output of a trained database maintenance failure profile ML model based on an input of the real-time performance metrics, wherein the database maintenance failure profile ML model is trained by correlating the historic performance related metrics of the time series dataset with a historic failure data profile of the time series dataset utilizing a second classification ML technique;

automatically determine an imminent failure in response to determining that the probability value is greater than a predetermined failure threshold value;

automatically generate a suggested recovery profile as an output of a trained database maintenance failure profile ML model based on the determining the imminent failure, wherein the database maintenance failure profile ML model is trained by correlating the historic performance related metrics of the time series dataset with a historic recovery profile of the time series data; and automatically send the suggested recovery profile to the remote client device of a user via the network connection.

* * * * *